US012657987B2

(12) United States Patent
Liao

(10) Patent No.: US 12,657,987 B2
(45) Date of Patent: Jun. 16, 2026

(54) AUTOMATIC WET WIPE DISPENSER AND ANTI-THEFT METHOD THEREFOR

(71) Applicant: XIAMEN MAHUA TECHNOLOGY CO., LTD., Xiamen (CN)

(72) Inventor: Yuxing Liao, Xiamen (CN)

(73) Assignee: XIAMEN MAHUA TECHNOLOGY CO., LTD., Xiamen (CN)

( * ) Notice: Subject to any disclaimer, the term of this patent is extended or adjusted under 35 U.S.C. 154(b) by 490 days.

(21) Appl. No.: 18/361,934

(22) Filed: Jul. 31, 2023

(65) Prior Publication Data

US 2025/0005993 A1 Jan. 2, 2025

(30) Foreign Application Priority Data

Jun. 29, 2023 (CN) ......................... 202310786428.2

(51) Int. Cl.
*G07F 11/00* (2006.01)
*A47K 10/32* (2006.01)
*A47K 10/36* (2006.01)

(52) U.S. Cl.
CPC ............ *G07F 11/005* (2013.01); *A47K 10/32* (2013.01); *A47K 2010/3266* (2013.01); *A47K 2010/3668* (2013.01)

(58) Field of Classification Search
CPC ........ G07F 11/005; G07F 9/002; G07F 9/026; G07F 11/04; G07F 11/24; G07F 17/18; G07F 1/1075; A47K 10/32; A47K 2010/3266; A47K 2010/3668; A47K 2010/3233; A47K 10/3625; A47K 10/424; A47K 10/44
See application file for complete search history.

(56) References Cited

U.S. PATENT DOCUMENTS 3,051,352 A * 8/1962 Greene .................... A47K 5/08 221/56
9,067,754 B2 * 6/2015 Petersen .................. G07C 3/08
11,983,678 B1 * 5/2024 Miller .............. G06Q 10/06312
2005/0171634 A1 * 8/2005 York ........................ G07F 11/68 700/231
2011/0132920 A1 * 6/2011 Petocchi ................ A47K 10/44 221/45
2012/0165974 A1 * 6/2012 Henson .............. A47K 10/3656 221/277

* cited by examiner

*Primary Examiner* — Timothy R Waggoner

(57) ABSTRACT

An automatic wet wipe dispenser and an anti-theft method for the automatic wet wipe dispenser are provided. The automatic wet wipe dispenser includes including a first box body and a wet wipe dispensing module. The wet wipe dispensing module is disposed in the first boxy body, and the wet wipe dispensing module includes a second box body and a roller assembly. The second box body is disposed in the first boxy body, a first wet wipe outlet is defined on the first box body, and a first accommodating cavity is defined in the first box body for accommodating the second box body, a first channel is formed between the first wet wipe outlet and the second box body. A second wet wipe outlet and a second accommodating cavity are defined on the second box body, the second wet wipe outlet is communicated with the first wet wipe outlet.

9 Claims, 13 Drawing Sheets

AUTOMATIC WET WIPE DISPENSER AND ANTI-THEFT METHOD THEREFOR

TECHNICAL FIELD

The present disclosure relates to a technical field of wet wipe dispensers, and in particular to an automatic wet wipe dispenser and an anti-theft method for the automatic wet wipe dispenser.

BACKGROUND

Shared tissue dispensers are shared intelligent devices built by new retail, Internet of Things (IoT), and artificial intelligence, which solves a problem of tissue use in public places having a lot of foot traffic to facilitate travelling tissue use for people. Currently, shared wet wipe dispensers are generally placed in public toilet areas, and wet wipes are generally placed in the shared wet wipe dispensers by packaging in each of small bags, and people may obtain a small bag of the wet wipes through scanning a quick response (QR) code for paying by mobile phones, which is convenient for people. However, current shared wet wipe dispensers are easy to jam due to a fact that materials of the wet wipes are soft, during a process of placing the wet wipes in the wet wipe dispensers or dispensing the wet wipes and when the wet wipes are driven by a roller, the wet wipes are easy to be folded to enter an area of the roller to cause jamming.

In addition, since the shared wet wipe dispensers are placed in public areas, the shared wet wipe dispensers are easy to be stolen, and there are multiple possible situations when the shared wet wipe dispensers disappear. First, the shared wet wipe dispensers may be detached and taken away in one piece, since the shared wet wipe dispensers need to move to different positions as required during promotion, when a shared wet wipe dispenser mounted in a specific position is disappeared, it is hard to determine whether the shared wet wipe dispenser is reasonably moved by a worker or is stolen. Second, when supplementing the wet wipes into each of the shared wet wipe dispensers, the worker generally scans a specific QR code and then turns over a cover of each of the shared wet wipe dispensers for supplementing the wet wipes into each of the shared wet wipe dispensers, and when lawbreakers steal a mobile phone of the worker or an account of the worker, the shared wet wipe dispensers may be easy to be directly opened by the lawbreakers, and all of the wet wipes in the shared wet wipe dispensers may be stolen by the lawbreakers. Third, since a wet wipe outlet of each of the shared wet wipe dispensers is directly communicated with an interior of each of the shared wet wipe dispensers, the lawbreakers may easily steal the wet wipes in the shared wet wipe dispensers through the wet wipe outlet by extending a sticky object into the wet wipe outlet.

SUMMARY

The present disclosure provides an automatic wet wipe dispenser for solving a problem that current shared wet wipe dispensers are easy to jam.

The present disclosure provides following technical solutions.

The present disclosure provides an automatic wet wipe dispenser, including a first box body and a wet wipe dispensing module. The wet wipe dispensing module is disposed in the first box body, and the wet wipe dispensing module includes a second box body and a roller assembly.

The second box body is disposed in the first box body, a first wet wipe outlet is defined on the first box body, and a first accommodating cavity is defined in the first box body for accommodating the second box body, a first channel is formed between the first wet wipe outlet and the second box body. A second wet wipe outlet and a second accommodating cavity are defined on the second box body, the second wet wipe outlet is communicated with the first wet wipe outlet, and the second accommodating cavity is configured to accommodate a plurality of wet wipes. The second box body includes an accommodating bottom surface, and the accommodating bottom surface tilts upward relative to the first channel, and a bottom hole is defined on the accommodating bottom surface. The second wet wipe outlet is defined on one side of the second box body, and is adjacent to the accommodating bottom surface. The roller assembly includes a first roller assembly, the first roller assembly is disposed below the bottom hole, and the first roller assembly is configured to drive the plurality of the wet wipes to transfer into the first channel. An inclined plate is disposed on a side of the bottom hole close to the first channel, the inclined plate is inclined downward from the accommodating bottom surface toward a direction of the first roller assembly, a bottom of the inclined plate is close to the first roller assembly.

Furthermore, an inclined angle of the inclined plate is 45°~75°.

Furthermore, the inclined angle of the inclined plate is 60°.

Furthermore, the second box body includes a front plate, the front plate is disposed at one side of the second box body close to the first channel, and the second wet wipe outlet is defined on a bottom of the front plate, and an inner surface of the front plate is disposed at a rear end of the accommodating bottom surface in a wet wipe dispensing direction, so as to form a gap between the bottom accommodating bottom surface and the inner surface of the front plate.

Furthermore, the roller assembly further includes a second roller assembly, the second roller assembly is disposed in the first channel, and the second roller assembly is capable of being synchronously rotated with the first roller assembly. The second roller assembly includes a first sub roller, a second sub roller, and a third sub roller. The second sub roller and the first sub roller are disposed at intervals to form a second channel for the plurality of the wet wipes to pass through. The third sub roller is disposed above the first channel, and the third sub roller is disposed between the first sub roller and the first roller assembly.

Furthermore, the first roller assembly includes a first roller, an outer side surface of the first roller includes a friction portion and a smooth portion, friction teeth are disposed on the friction portion, and a diameter of the friction portion is greater than a diameter of the smooth portion.

Furthermore, a work code is disposed in the first box body, and the work code is configured to be scanned by a worker for identity verification, the automatic wet wipe dispenser includes a flip cover, a mounting module, and a signal transmission module. The flip cover is disposed at an opening at a top of the first box body, a mechanical lock and a first sensor are disposed on the flip cover, the mechanical lock is capable of being locked on the first box body, the first sensor is configured to sense the flip cover. The mounting module is disposed in the first box body, the mounting module includes a quick release plate, the quick release plate is detachably disposed on a back of the first box body, a second sensor is disposed on the back of the first box body, and the second sensor is configured to sense the quick release plate. The signal transmission module is electrically connected to a verification module, the first sensor, and the second sensor, and the signal transmission module is in network connection with a cloud server, the signal transmission module is configured to transmit a first signal of the first sensor and a second signal of scanning the work code by the worker to the cloud server. The signal transmission module sends first alarm information to the cloud server when the signal transmission module receives the first signal of the first sensor but does not receive the second signal of scanning the work code by the worker for the identity verification within a predetermined period; or, the signal transmission module sends the first alarm information to the cloud server when the signal transmission module receives the first signal of the first sensor but the worker does not pass the identity verification after scanning the work code.

Furthermore, the work code is disposed on an inner surface of the flip cover.

Furthermore, a third sensor is disposed in the first accommodating cavity, and the third sensor is configured to sense the second box body, and the third sensor is connected to the signal transmission module.

Furthermore, at least two L-shaped blocks facing upward are disposed on the quick release plate. At least two mounting holes are defined on the back of the first box body for the at least two L-shaped blocks to insert. The mounting module further includes at least two locking components, and the at least two locking components are rotatably disposed below the at least two mounting holes, so as to abut lower portions of the at least two L-shaped blocks when the at least two L-shaped blocks are inserted into the at least two mounting holes.

The present disclosure further provides an anti-theft method for the automatic wet wipe dispenser, executed when disassembling the automatic wet wipe dispenser, including following steps.

- Step S1: unlocking the mechanical lock through a mechanical key to turn over a flip cover, transmitting the first signal of the first sensor to the cloud server by the first sensor.
- Step S2: scanning the work code to obtain verification information for the identity verification within the predetermined period by a specific account to determine situations by the cloud server as follows:
- situation (a): generating second alarm information by the cloud server, when the verification information obtained by scanning the work code is not received within the predetermined period;
- situation (b): canceling the second alarm information, when the verification information obtained by scanning the work code is received overtime;
- situation (c): generating third alarm information by the cloud server, when the verification information obtained for the identity verification is denied; and
- situation (d), backing up operation information to the cloud server, when the verification information obtained by scanning the work code is received within the predetermined period and is passed.
- Step S3: in the step S2, when any one of the situations (a), (b), and (c) occurs, sending fourth alarm information to the cloud server if taking out the second box body is sensed by the second sensor, and sending fifth alarm information to the cloud server if moving the first box body away from the quick release plate is sensed by the third sensor.

Beneficialeffects are as follows.

The inclined plate is disposed at the bottom hole of the second box body, the inclined plate tilts upward toward a direction of the first channel, so that the wet wipes may not be folded to enter areas of the first roller assembly and the second roller assembly to cause jamming during a process of placing the wet wipes in the automatic wet wipe dispenser or dispensing the wet wipes, which may effectively prevent the automatic wet wipe dispenser from jamming. Meanwhile, tilting the inclined plate upward toward the direction of the first channel may be matched with the first roller assembly and the second roller assembly, so that the wet wipes entering the first roller assembly and the second roller assembly may be driven by the first roller assembly and the second roller assembly to climb upward along the inclined plate, which effectively solves a problem of jamming.

In addition, the present disclosure further provides a dual identity verification mode of setting the mechanical lock and the work code, which effectively solves a problem that whether opening the automatic wet wipe dispenser or disassembling the automatic wet wipe dispenser is legal or not is hard to determine. Specifically, the mechanical lock is configured to turn over the flip cover, the work code is disposed in the first box body, when the worker turns over the flip cover through the mechanical lock, the identity verification needs to be performed through scanning the work code within the predetermined period. If the identity verification is denied or is verified overtime, the second alarm information and the third alarm information may be sent to the cloud server, so that a cloud platform may quickly obtain that the automatic wet wipe dispenser is abnormal and may be stolen, so as to quickly respond to this situation. The work code is disposed in the first box body, so that only turning over the flip cover may perform the identity verification, and the identity verification needs to be verified in the predetermined period. On the one hand, a situation that the work code may be utilized by a lawbreaker or be cracked by the lawbreaker when the work code is disposed on an outer surface of the automatic wet wipe dispenser is avoided, on the other hand, a situation that mistakenly scanning the work code by users when the work code is disposed on the outer surface of the automatic wet wipe dispenser is further avoided.

DETAILED DESCRIPTION

Figure 1:
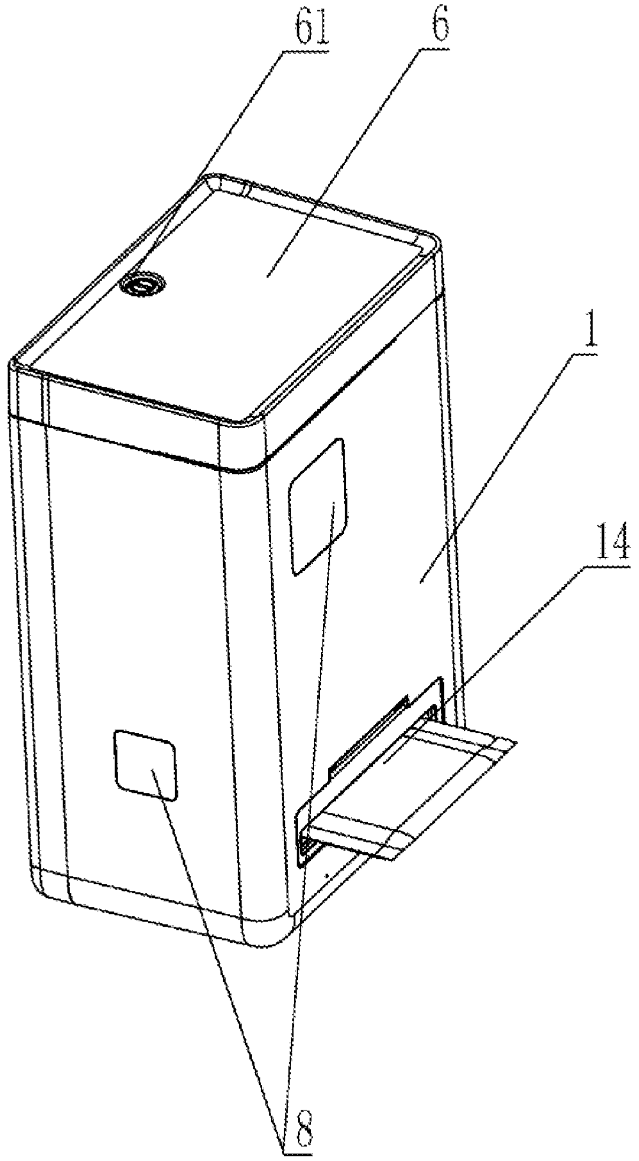
FIG. 1 is a structural schematic diagram of an automatic wet wipe dispenser according to one embodiment of the present disclosure.

As shown in FIGS. 1-12, the present disclosure provides an automatic wet wipe dispenser, including a first box body 1 and a wet wipe dispensing module 3. The wet wipe dispensing module 3 is disposed in the first box body 1, and the wet wipe dispensing module 3 includes a second box body 2 and a roller assembly. The second box body 2 is disposed in the first box body 1, a first wet wipe outlet 14 is defined on the first box body 1, and a first accommodating cavity 12 is defined in the first box body 1 for accommodating the second box body 2, a first channel 15 is formed between the first wet wipe outlet 14 and the second box body 2. A second wet wipe outlet 27 and a second accommodating cavity 21 are defined on the second box body 2, the second wet wipe outlet 27 is communicated with the first channel 15, and the second accommodating cavity 21 is configured to accommodate a plurality of wet wipes. The second box body 2 includes an accommodating bottom surface 22, and the accommodating bottom surface 22 tilts upward relative to the first channel 15, and a bottom hole 23 is defined on the accommodating bottom surface 22. The second wet wipe outlet 27 is defined on one side of the second box body 2, and is adjacent to the accommodating bottom surface 22. The roller assembly includes a first roller assembly 32, the first roller assembly 32 is disposed below the bottom hole 23, and the first roller assembly 32 is configured to drive the plurality of the wet wipes to transfer into the first channel 15. An inclined plate 24 is disposed on a side of the bottom hole 23 close to the first channel 15, the inclined plate 24 is inclined downward from the accommodating bottom surface 22 toward a direction of the first roller assembly 32, a bottom of the inclined plate 24 is close to the roller assembly to prevent the plurality of the wet wipes from falling into the bottom hole 23.

As shown in FIGS. 1-5, in the embodiment, a work code 7 is disposed in the first box body 1, and the work code 7 is configured to be scanned by a worker for identity verification. The automatic wet wipe dispenser further includes a flip cover 6, a mounting module 4, and a signal transmission module 5. The flip cover 6 is disposed at an opening at a top of the first box body 1, a mechanical lock 61 and a first sensor (not shown in the drawings) are disposed on the flip cover 6, the mechanical lock 61 is capable of being locked on the first box body 1, the first sensor is configured to sense the flip cover 6. The mounting module 4 is disposed in the first box body 1, the mounting module 4 includes a quick release plate 41, the quick release plate 41 is detachably disposed on a back of the first box body 1, a second sensor 16 is disposed on the back of the first box body 1, and the second sensor 16 is configured to sense the quick release plate 41. The signal transmission module 5 is electrically connected to a verification module, the first sensor, and the second sensor 16, and the signal transmission module 5 is in network connection with a cloud server, the signal transmission module 5 is configured to transmit a first signal of the first sensor and a second signal of scanning the work code 7 by the worker to the cloud server. The signal transmission module 5 sends first alarm information to the cloud server when the signal transmission module 5 receives the first signal of the first sensor but does not receive the second signal of scanning the work code 7 by the worker for the identity verification within a predetermined period; or, the signal transmission module 5 sends the first alarm information to the cloud server when the signal transmission module 5 receives the first signal of the first sensor but the worker does not pass the identity verification after scanning the work code 7.

In the embodiment, when using the automatic wet wipe dispenser, users need to scan a user code 8 disposed on an outer portion of the first box body 1 through mobile terminals and complete operations, such as payment, and then the plurality of the wet wipes may be dispensed through the first channel 15. The user scans the user code 8 and the work code 7 to connect to a corresponding interface of the cloud server, and operates to realize corresponding functions through the cloud server. The worker has a specific account, and scanning the work code 7 through the specific account may pass identity verification.

Figure 4:
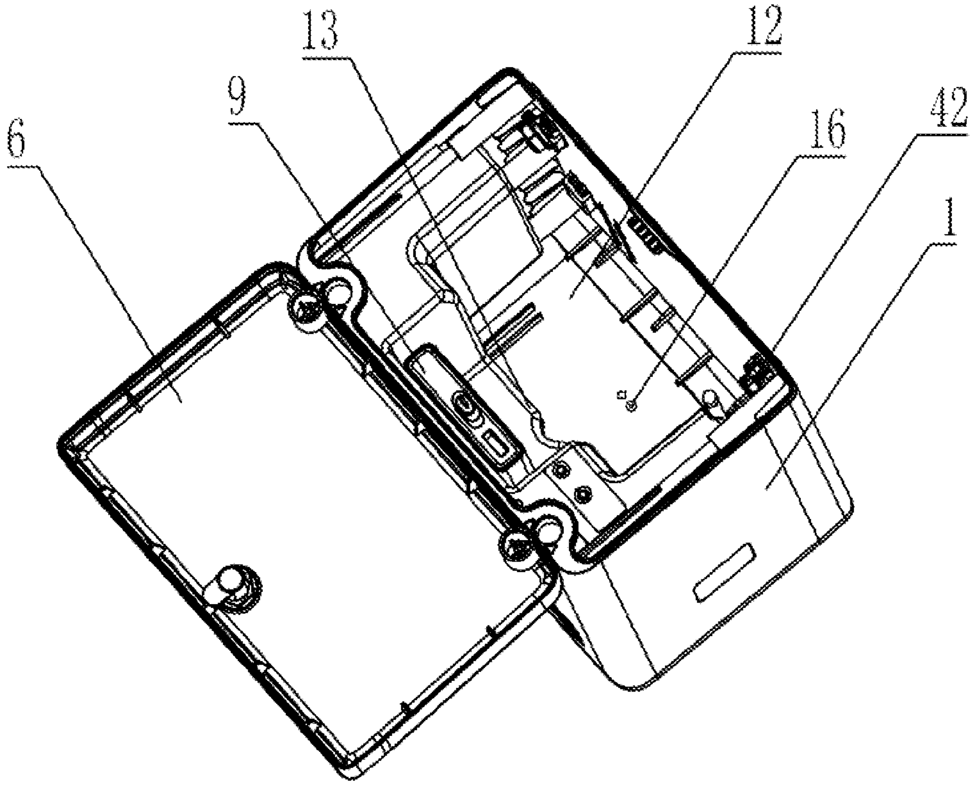
FIG. 4 is an inner structural schematic diagram of a first box body of the automatic wet wipe dispenser according to one embodiment of the present disclosure.
Figure 5:
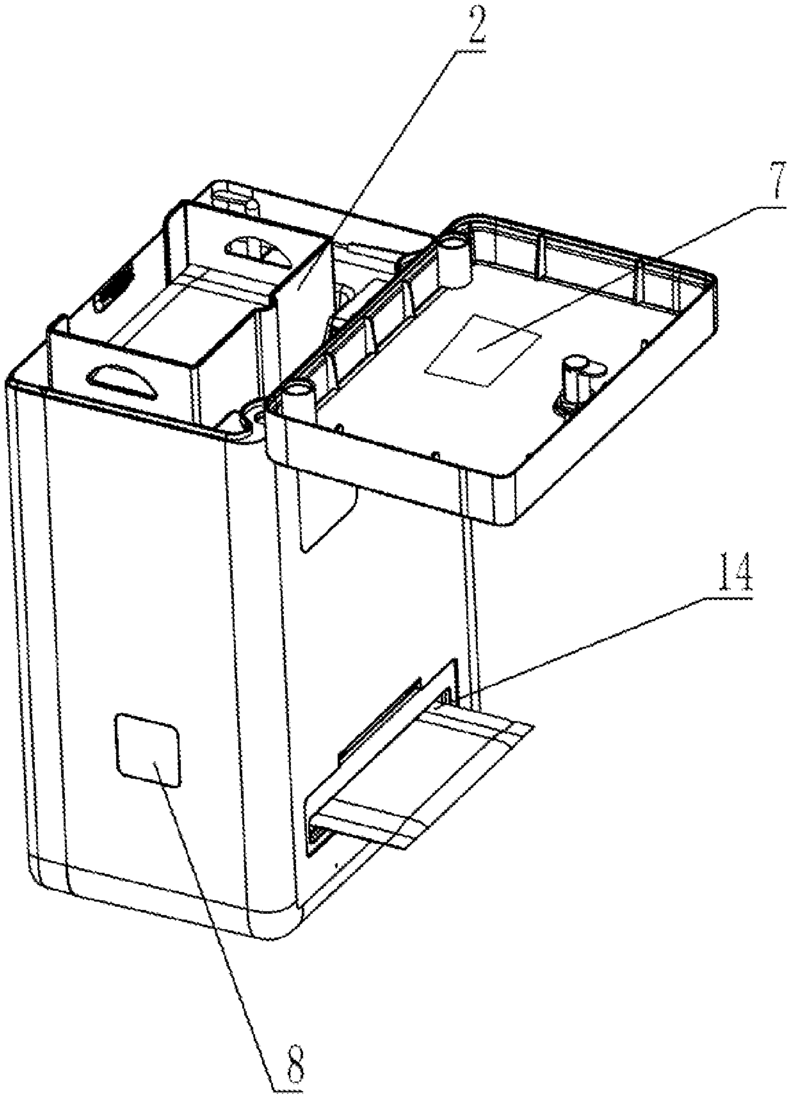
FIG. 5 is a structural schematic diagram of the automatic wet wipe dispenser shown in another angle according to one embodiment of the present disclosure.

As shown in FIG. 4, in the embodiment, the first accommodating cavity 12 is disposed on the first box body 1 for accommodating the second box body 2. The first accommodating cavity 12 is in a structure having a narrower upper portion and a wider lower portion, and the narrower upper portion is configured to accommodate a power supply 9. The second box body 2 may be shaped as a square housing, specifically, the second box body 2 may include a rear plate 25, a front plate 26, and an accommodating bottom surface 22. An opening is defined at a top of the second box body 2 for inputting the plurality of the wet wipes. A long groove 251 is defined on the rear plate 25, and the long groove 251 is convenient for the second box body 2 to sort the plurality of the wet wipes in the second box body 2 after the plurality of the wet wipes are disposed in the second box body 2, the second wet wipe outlet 27 is formed at an intersection of the front plate 26 and the accommodating bottom surface 22, and the second wet wipe outlet 27 is close to and communicated with the first channel 15. Since the plurality of the wet wipes are soft products, when the plurality of the wet wipes are stacked in the second box body 2, a side surface of each of the plurality of the wet wipes close to the first channel 15 may be warped or folded downward, when the side surface of each of the plurality of the wet wipes is warped to easily abut an inner side surface of the front plate 26 to dispense the plurality of the wet wipes, the plurality of the wet wipes may not be successfully dispensed from the first channel 15. An inner surface of the front plate 26 is disposed at a rear end of the accommodating bottom surface 22 in a wet wipe dispensing direction, so as to form a gap between the bottom accommodating bottom surface 22 and the inner surface of the front plate 26, so that when a wet wipe falls down, a side of the wet wipe close to the first channel 15 may partially enter the first channel 15, so as to avoid a situation that the wet wipe is folded at a position of the first channel 15 and may not be quickly dispensed from the first channel 15 and further avoid a situation of causing jamming. In one embodiment, a bottom of the front plate 26 has a certain height from the accommodating bottom surface 22, that is, a height of the second wet wipe outlet 27 is a total thickness of about three to five wet wipe bags, and a higher second wet wipe outlet 27 may be provided to solve a problem that edges of bottom-most wet wipes may be easily warped or folded due to accumulation and extrusion of wet wipes at a bottom of the second box body 2 when the worker puts relatively more wet wipes in the automatic wet wipe dispenser. Such structure mainly has two advantages. First, more spaces may be provided for activity of the plurality of the wet wipes, since a relatively large activity space in a width range is provided for the plurality of the wet wipes at a position of the second wet wipe outlet 27, thereby avoiding a problem that one of the plurality of the wet wipes close to the first channel 15 abuts the inner side surface of the front plate 26. Second, since a height of the second box body 2 is relatively high, when taking out the second box body 2 for inputting the plurality of the wet wipes, the bottom-most wet wipes may be inclined or folded due to a relatively long track of inputting the bottom-most wet wipes from an inlet to the bottom of the second box body 2 and is hard to sort, therefore, a higher second wet wipe outlet 27 is provided to specifically sort the bottom-most wet wipes, so as to avoid situations of folding or inclining the plurality of the wet wipes. Furthermore, a stepped surface 13 is disposed in the first accommodating cavity 12, the stepped surface 14 is configured to receive the bottom of the front plate 26, so as to limit the second box body 2 on the stepped surface 13, the stepped surface 14 receives the bottom of the front plate 26, so as to limit the second box body 2 at a proper height, which prevents the first roller assembly 32 from being directly pressed by a whole body of the second box body 2 and the plurality of the wet wipes, and then prevents the first roller assembly 32 from bearing a large pressure.

As shown in FIGS. 6-12, the accommodating bottom surface 22 of the second box body is slightly inclined upward toward a direction of the first channel 15, and the bottom hole 23 for exposing a friction portion 321 of the first roller assembly 32 on an upper surface of the accommodating bottom surface 22. An inclined angle of the accommodating bottom surface 22 is 5°~15°, and preferably 10°. Being inclined upward refers to that a height of a first side of the accommodating bottom surface 22 close to the first channel 15 is higher than a height of a second side of the accommodating bottom surface 22 distal from the first channel 15. Such structure may effectively solve a problem that the plurality of the wet wipes fall down to be directly clamped into the bottom hole and further cooperates with the first roller assembly 32 and a second roller assembly 33 to more easily enter the plurality of the wet wipes into the first channel 15. The inclined plate 24 is disposed on a side of the bottom hole 23 close to the first channel 15, the inclined plate 24 is inclined downward from the accommodating bottom surface 22 toward the direction of the first roller assembly 32, being inclined downward refers to that a height of a first side of the inclined plate 24 close to the first channel 15 is higher than a height of a second side of the inclined plate 24 close to the first roller assembly 32. A bottom of the inclined plate 24 is close to the first roller assembly 32. The inclined plate 24 is provided to solve a problem that the plurality of the wet wipes are folded or edges and corners of the plurality of the wet wipes enter the bottom hole 23, causing jamming of the first roller assembly 32 by the plurality of the wet wipes. The inclined plate 24 is further inclined upward, when the plurality of the wet wipes are clamped on the inclined plate 24, side edges of the plurality of the wet wipes may slide upward along the inclined plate 24 so as to enter the first channel. Furthermore, a length of the bottom hole 23 and a width of the bottom hole 23 are less than a length of each of the plurality of the wet wipes and a width of each of the plurality of the wet wipes, so as to solve a problem that the side edges of the plurality of the wet wipes enter the bottom hole 23 due to folding of the plurality of the wet wipes. In the embodiment, an inclined angle of the inclined plate is 45°~75°, preferably 60°, since when the inclined angle of the inclined plate is 60°, the plurality of the wet wipes abut against the inclined plate 24 and match with an inclined bottom plate, so that the plurality of the wet wipes may be quickly disengaged from the inclined plate 24 when the first roller assembly 32 rolls. In one embodiment, a jacking component (not shown in the drawings) may be disposed at two ends of the inclined plate 24. The jacking component is controlled by an air cylinder or a linear motor. When a sensor of the first channel 15 rotates two circles or multiple circles on the first roller assembly 32, there is still no wet wipe dispensed, and when the second sensor 16 senses that there are still wet wipes in the second box body 2, a system determines that the jamming is caused, and at this time, the plurality of the wet wipes are jacked up from the bottom hole 23, so that a problem of jamming is solved.

Figure 6:
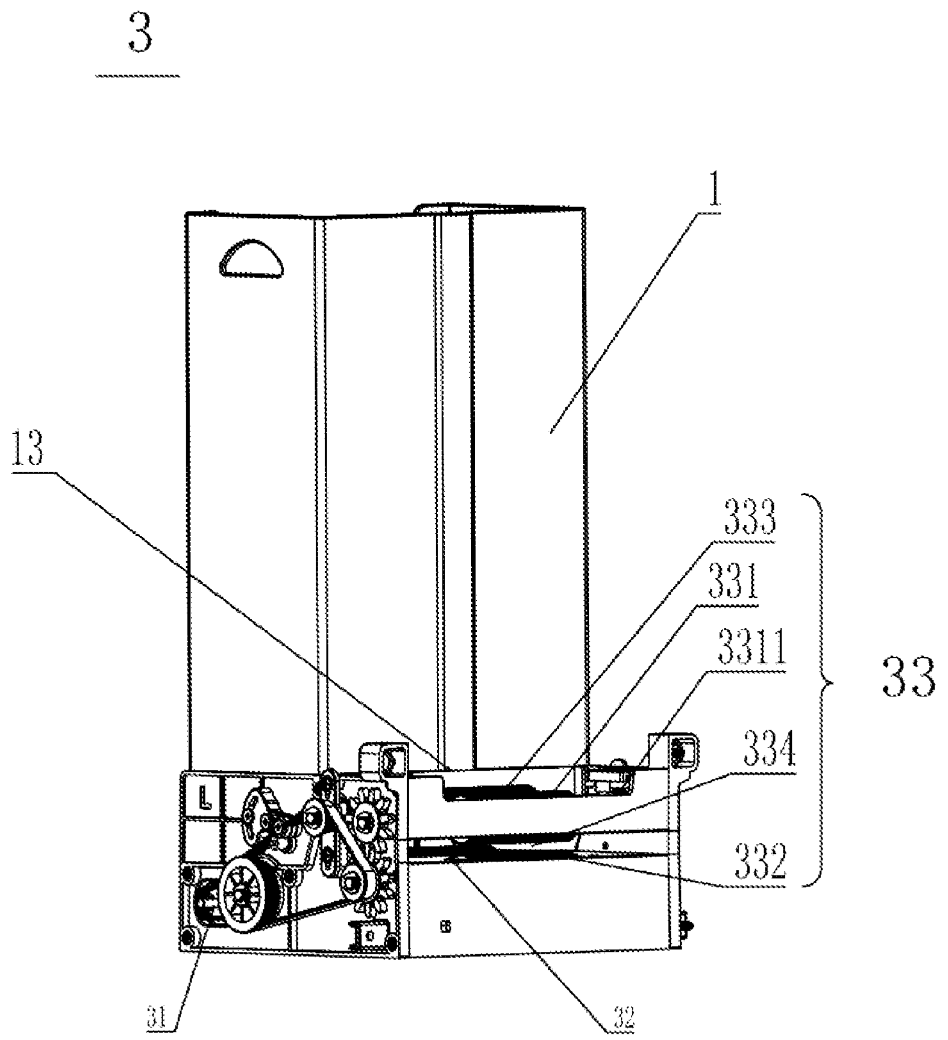
FIG. 6 is a structural schematic diagram illustrating cooperation between the wet wipe dispensing module and a second box body of the automatic wet wipe dispenser according to one embodiment of the present disclosure.
Figure 7:
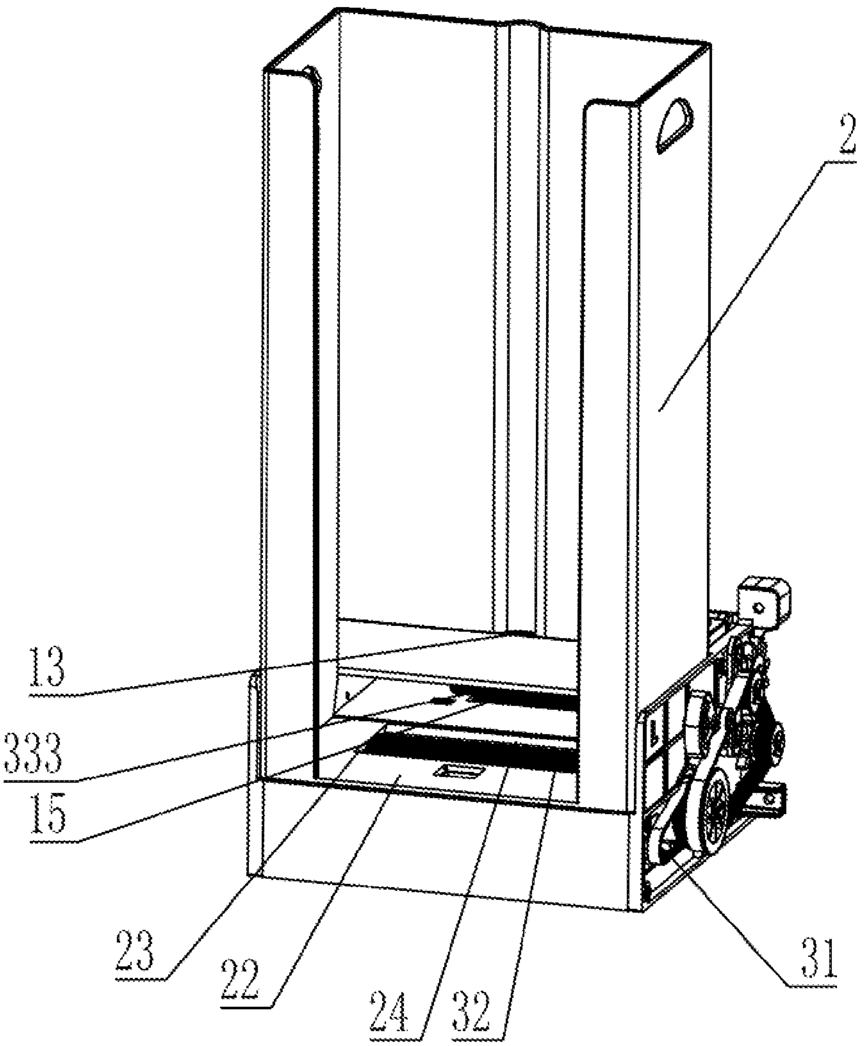
FIG. 7 is another structural schematic diagram illustrating cooperation between the wet wipe dispensing module and the second box body of the automatic wet wipe dispenser according to one embodiment of the present disclosure.
Figure 8:
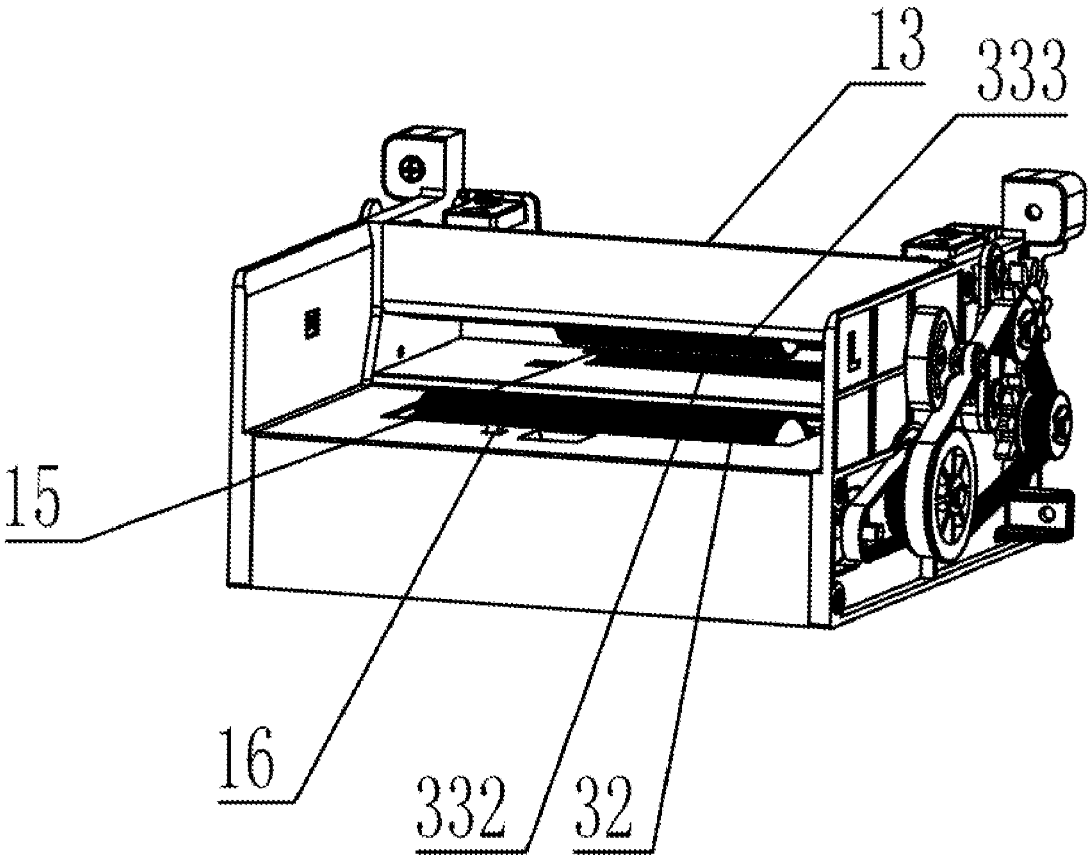
FIG. 8 is a structural schematic diagram of the wet wipe dispensing module of the automatic wet wipe dispenser according to one embodiment of the present disclosure.
Figure 9:
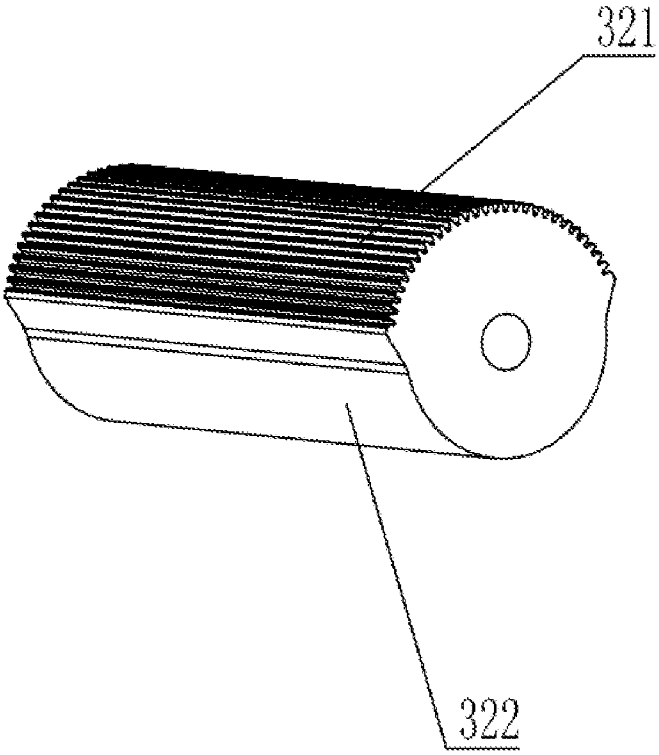
FIG. 9 is a structural schematic diagram of a first roller of the wet wipe dispensing module of the automatic wet wipe dispenser according to one embodiment of the present disclosure.
Figure 10:
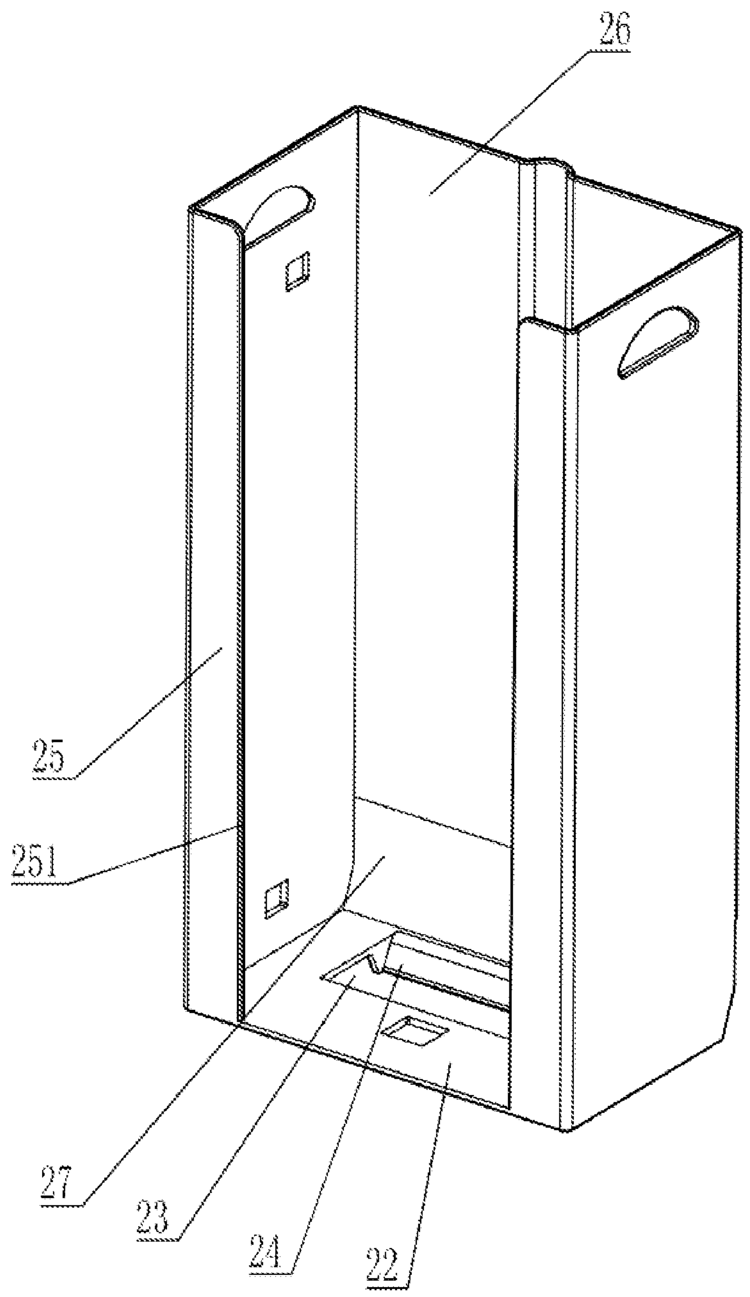
FIG. 10 is a structural schematic diagram of the second box body of the automatic wet wipe dispenser according to one embodiment of the present disclosure.
Figure 11:
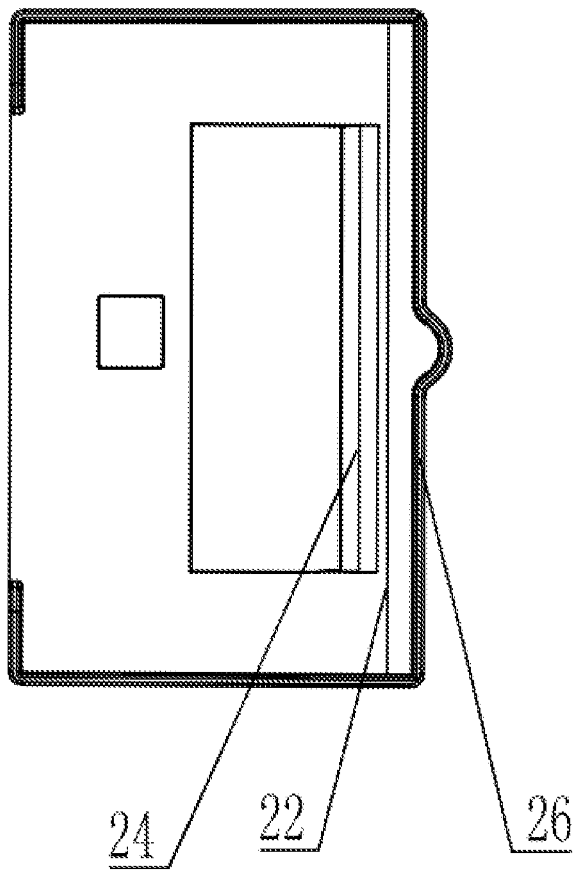
FIG. 11 is a structural schematic diagram of a bottom view of the second box body of the automatic wet wipe dispenser according to one embodiment of the present disclosure.
Figure 12:
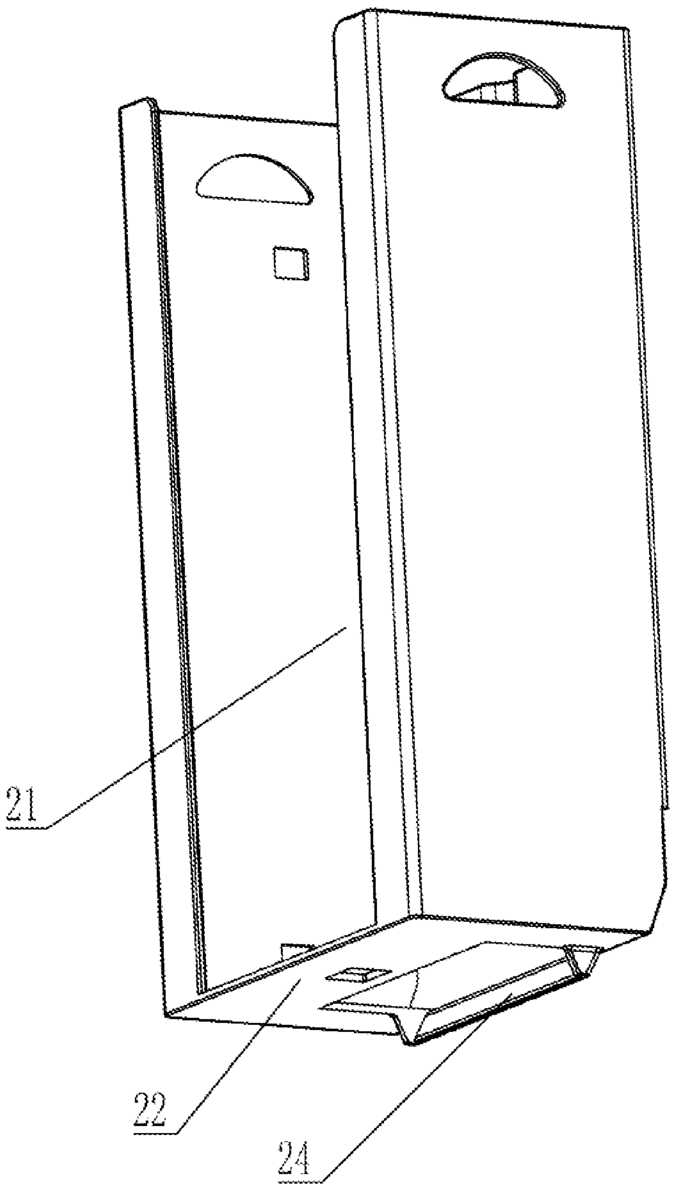
FIG. 12 is another structural schematic diagram of the second box body of the automatic wet wipe dispenser according to one embodiment of the present disclosure

As shown in FIGS. 6-8, the second sensor 16 is disposed at a bottom of the first accommodating cavity 12, the second sensor 16 may include a first photoelectric sensor and a contact switch, where the first photoelectric sensor faces an interior of the second box body 2 and is configured to detect whether there are wet wipes in the second box body 2, and the contact switch is adapted to be in contact with the bottom surface of the second box body 2, thereby determining whether the second box body 2 is placed in place. In addition, second photoelectric sensors are disposed at an upper portion and a lower portion of a side edge of the first accommodating cavity 12, so that an amount of the plurality of the wet wipes in the second box body 2 may be detected.

The first wet wipe outlet 14 is defined on the first box body 1, the first channel 15 is formed between the first wet wipe outlet 14 and the second box body 2. The wet wipe dispensing module 3 further includes the first roller assembly 32 and the second roller assembly 33, the second roller assembly 33 is disposed in the first channel 15, and the second roller assembly 33 is capable of being synchronously rotated with the first roller assembly 32. The second roller assembly 33 includes a first sub roller 331, a second sub roller 332, and a third sub roller 333. The second sub roller 331 and the first sub roller 332 are disposed at intervals to form a second channel 334 for the plurality of the wet wipes to pass through. The third sub roller 333 is disposed above the first channel 15, and the third sub roller 333 is disposed between the first sub roller 331 and the first roller assembly 32.

As shown in FIGS. 6-8, specifically, the first roller assembly 32 includes a first roller, an outer side surface of the first roller includes a friction portion 321 and a smooth portion 322, friction teeth are disposed on the friction portion, and a diameter of the friction portion 321 is greater than a diameter of the smooth portion 322 to form a cam-like structure. The first roller assembly 32 is configured to convey the bottom-most wet wipe in the second box body 2 to the first channel 15 in a friction manner, and when the friction teeth rotate to a top of the bottom hole 23, a top end of the friction teeth is higher than the bottom hole 23 to be in contact with the bottom-most wet wipe, and the bottom-most wet wipe is driven to move toward the first channel 15 by friction force. In one embodiment, the first roller assembly 32 is provided to cooperate with the accommodating bottom surface 22 being slightly inclined upward, a large friction force may still be generated when the wet pipes in the second box body 2 are less. In addition, since the first roller is in a cam-like structure, when the first roller rolls, the wet wipes may be jacked upward, on one hand, pressure is improved to improve the friction force, and on the other hand, the wet wipes can be jacked up from the bottom hole 23 to avoid jamming. In one embodiment, the friction teeth are made of an elastic material, such as a silica gel material and a rubber material, and have a small amount of viscosity. For example, a viscous material may be added at some positions, so that friction force may be improved, and the wet wipes in the second box body 2 may be driven to move by means of a viscous effect when the amount of the wet wipes in the second box body 2 is small.

The second roller assembly 33 is configured to convey the wet wipes conveyed from the first roller assembly 32, and the wet wipes conveyed by the first roller assembly 32 are first received by a lower portion of the third sub roller 333 disposed above the first channel 15. Since the wet wipes have an upper trend when the wet wipes are conveyed and are slightly inclined upward, the wet wipes may be pressed down through the lower portion of the third sub roller 333, and the wet wipes are guided to a channel between the first sub roller 331 and the second roller, and at the same time, the third sub roller 333 may also block other wet wipes located at the paper outlet notch 27 to prevent the plurality of the wet wipes from being dispensed at a time. The first sub roller 331 is disposed above the first channel 15, and has a lifting function. Specifically, in one embodiment, an elastic component 3311 may be provided to enable the first sub roller 331 to have a certain up-down floating capability, thereby preventing jamming caused by rigid connection, and facilitating maintenance and processing. In another embodiment, a lifting mechanism is disposed at a position of a rotating shaft of the first sub roller 331, when the user scans a quick response (QR) code, the lifting mechanism is controlled by the cloud server or a controller in the automatic wet wipe dispenser to drive the first sub roller 331 to a height where the plurality of the wet wipes are easy to pass and enable the first sub roller 331 to rotate, so that the plurality of the wet wipes may be smoothly dispensed, and the plurality of the wet wipes may be prevented from being stolen by a lawbreaker through the first wet wipe outlet 14 when the user does not scan the QR code. Hobbing teeth are disposed on the first sub roller 331, the second sub roller 332, and the third sub roller 333 to improve the friction force, and a gap between the first sub roller 331 and the second sub roller 332 is less than the total thickness of the plurality of the wet wipes in a natural state. When dispensing the wet wipes, the first sub roller 331 may automatically adjust a height of the second channel 334 due to an elastic action or an action of the lifting mechanism, so that the plurality of the wet wipes are prevented from being stolen by the lawbreaker through adhering the plurality of the wet wipes through tools, such as a sticky rod, extending into the first wet wipe outlet 14. The first roller assembly 32 and the second roller assembly 33 are connected to the same power motor 31, and may be linked through a gear or a transmission belt to realize synchronous rotation.

Figure 2:
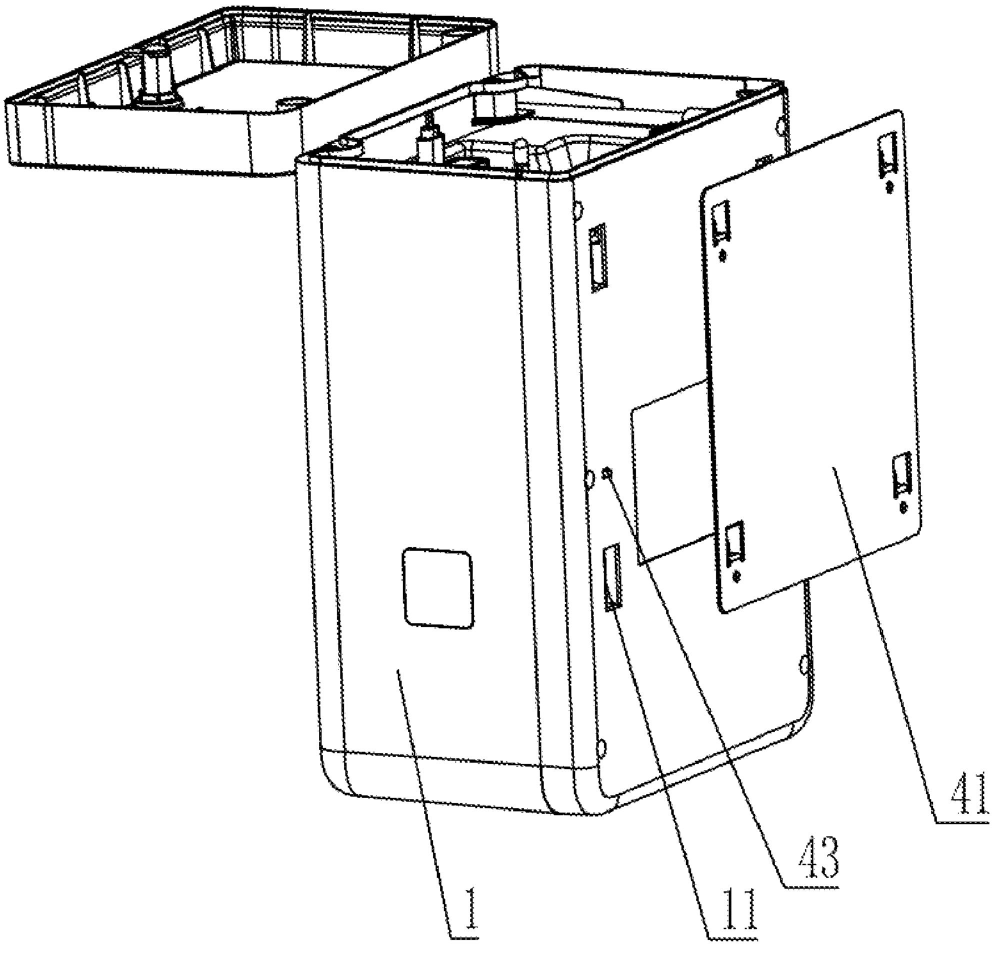
FIG. 2 is an exploded structural schematic diagram of a mounting module of the automatic wet wipe dispenser according to one embodiment of the present disclosure.
Figure 3:
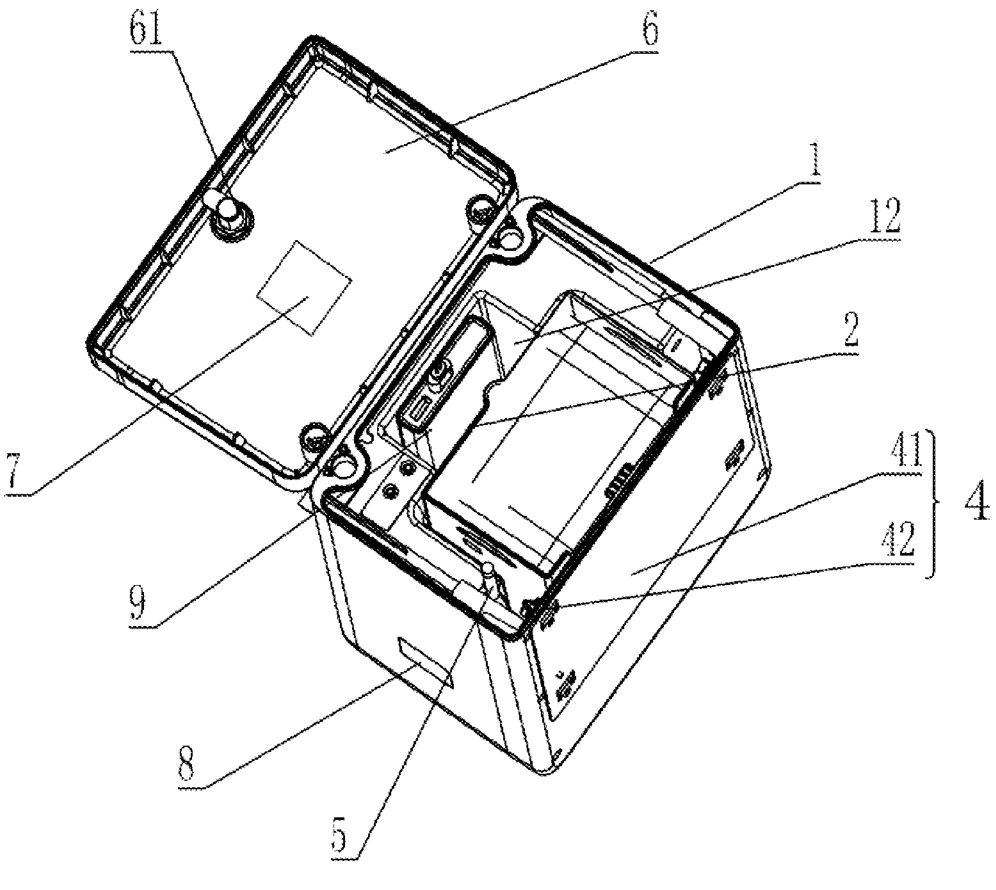
FIG. 3 is an inner structural schematic diagram of the automatic wet wipe dispenser according to one embodiment of the present disclosure.
Figure 13:
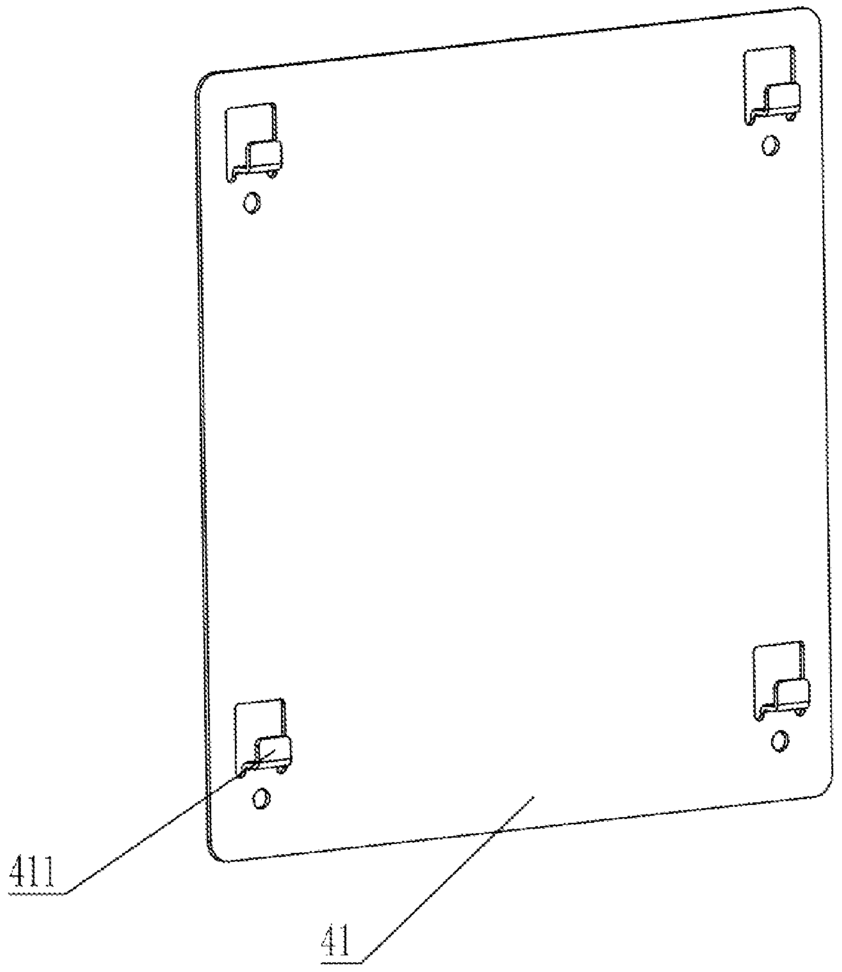
FIG. 13 is a structural schematic diagram of a quick release plate of the automatic wet wipe dispenser according to one embodiment of the present disclosure Reference numerals in the drawings: 1. first box body; 11. mounting hole; 12. first accommodating cavity; 13. stepped surface; 14. first wet wipe outlet; 15. first channel; 16. second sensor; 2. second box body; 21. second accommodating cavity; 22. accommodating bottom surface; 23. bottom hole; 24. inclined plate; 25. rear plate; 251. long groove; 26. front plate; 27. second wet wipe outlet; 3. wet wipe dispensing module; 31. power motor; 32. first roller assembly; 321 friction portion; 322. smooth portion; 33. second roller assembly; 331. first sub roller; 3311. elastic component; 332. second sub roller; 333. third sub roller; 334. second channel; 4. mounting module; 41. quick release plate; 42. locking component; 411. L-shaped blocks; 43. third sensor; 5. signal transmission module; 6. flip cover; 61. mechanical lock; 7. work code; 8. user code; 9. power supply.

As shown in FIGS. 2 and 13, in the embodiment, the mounting module 4 further includes at least two locking components 42 and a quick release plate 41, the quick release plate 41 is adapted to be fixed on a wall or other plane by means of a fixing component, such as a bolt. At least two L-shaped blocks 411 facing upward are disposed on the quick release plate. At least two mounting holes 11 are defined on the back of the first box body 1 for the at least two L-shaped blocks 411 to insert, and the at least two locking components 42 are rotatably disposed below the at least two mounting holes 11, so as to abut lower portions of the at least two L-shaped blocks 411 when the at least two L-shaped blocks 411 are inserted into the at least two mounting holes 11. A third sensor 43 for sensing the quick release plate 41 is disposed on the back of the first box body 1, and the third sensor 43 may be a photoelectric sensor, and when the third sensor 43 senses that the quick release plate 41 moves away, a signal may be sent to the signal transmission module 5, so that the signal transmission module 5 transmits disassembly information to the cloud server. Each of the at least two locking components includes a locker, and the locker is disposed in the first box body 1. When the at least two L-shaped blocks 411 are inserted into the mounting hole 11, the locker abuts against a lower portion of each of the at least two L-shaped blocks 411, the at least two L-shaped blocks 411 abut against the mounting hole 11, and a limiting rib is further disposed above the mounting hole 11 to prevent each of the at least two L-shaped blocks 411 from shaking back and forth after being tightened.

In the embodiment, the flip cover 6 is rotatably disposed on the first box body 1, so that a function of the flip cover 6 may be realized, the mechanical lock 61 is disposed on the flip cover 6, the mechanical lock 61 is equipped with a mechanical key, and the mechanical lock 61 may be unlocked by the mechanical key to control the flip cover 6 to turn over. The work code 7 is disposed on an inner side surface of the flip cover 6, so that the worker may scan the work code 7 for further setting only after the flip cover 6 is turned over, the first sensor is disposed on the flip cover 6 and the first sensor may be a photoelectric sensor or may be a proximity switch, etc.

In the embodiment, the first box body 1 further includes a controller, the power supply 9, a wireless transmission module, or the signal transmission module 5, and the controller, the power supply 9, the wireless transmission module, or the signal transmission module 5 are configured to transmit information in the first box body 1 to the cloud server. The power supply 9 may be a movable battery, such as a power bank, a lithium battery, etc., so that the user may conveniently take out the power supply 9 from the first accommodating cavity 12, so that the automatic wet wipe dispenser may be used at a position where the power supply 9 is not available. The power supply 9 is placed in a space of a protruding portion of the first accommodating cavity 12, and compared with current hidden power supplies, the power supply 9 is more convenient for the worker to replace. However, an exposed power supply is easily stolen, whether the exposed power supply is out of power or stolen is hard to determine after the exposed power supply is missed. Therefore, an anti-theft control method for the power supply 9, comprising the following steps:

(1) turning covering the flip cover 6, and transmitting a first signal of the first sensor to the signal transmission module.

(2) scanning, scanning the work code 7 by the worker through the specific account.

(3) disconnecting the power supply 9 when the work code 8 scanned in the (2) is verified and passed, and perming a normal process; comparing a period of the power supply 9 and a period of historical replacement battery according to the cloud server when the work code scanned in the (2) is not passed or the power supply 9 is still not reconnected after a predetermined period when not executing the (2), determining a normal battery replacement program if a duration of the period of the power supply 9 and the period of the historical replacement battery is within 5%, and determining the power supply 9 is stolen if a duration of the period of the power supply 9 and the period of the historical replacement battery is over 5%.

The predetermined period is a period required for the work to change the battery in normal. By means of the control method, when the worker forgets to scan the work code, it can also be determined according to historical situations that the battery is normally replaced or the battery is stolen, so as to have further processing.

The present disclosure further provides an anti-theft method for the automatic wet wipe dispenser, executed when disassembling the automatic wet wipe dispenser, including following steps.

Step S1: unlocking the mechanical lock through a mechanical key to open a flip cover, transmitting the first signal of the first sensor to the cloud server by the first sensor.

Step S2: scanning the work code to obtain verification information for the identity verification within the predetermined period by a specific account to determine situations by the cloud server as follows.

Situation (a): generating second alarm information by the cloud server, when the verification information obtained by scanning the work code is not received within the predetermined period.

Situation (b): canceling the second alarm information, when the verification information obtained by scanning the work code is received overtime.

Situation (c): generating third alarm information by the cloud server, when the verification information obtained for the identity verification is denied.

Situation (d), backing up operation information to the cloud server, when the verification information obtained by scanning the work code is received within the predetermined period and is passed.

Step S3: in the step S2, when any one of the situations (a), (b), and (c) occurs, sending fourth alarm information to the cloud server if taking out the second box body is sensed by the second sensor, and sending fifth alarm information to the cloud server if moving the first box body away from the quick release plate is sensed by the third sensor.

The automatic wet wipe dispenser maintains a connection with the cloud server regardless of whether the verification information is passed or there is no verification operation. The difference lies in that when the verification information is not passed or the verification operation is not performed in time, specific alarm information is generated to the cloud server, and the cloud server reminds a manager in a special manner, and when the verification information is passed, the transmitted information is only used as a data backup of background, so as to reduce management pressure of the manager.

The present disclosure provides a dual identity verification mode of setting the mechanical lock 61 and the work code 7, which effectively solves a problem that whether opening the automatic wet wipe dispenser or disassembling the automatic wet wipe dispenser is legal or not is hard to determine. Specifically, the mechanical lock 61 is configured to turn over the flip cover 6, the work code 7 is disposed in the first box body 1, when the worker turns over the flip cover 6 through the mechanical lock 61, the identity verification needs to be performed through scanning the work code 7 within the predetermined period. If the identity verification is denied or is verified overtime, the second alarm information and the third alarm information may be sent to the cloud server, so that a cloud platform may quickly obtain that the automatic wet wipe dispenser is abnormal and may be stolen, so as to quickly respond to this situation. The work code 7 is disposed in the first box body 1, so that only turning over the flip cover 6 may perform the identity verification, and the identity verification needs to be verified in the predetermined period. On the one hand, a situation that the work code 7 may be utilized by a lawbreaker or be cracked by the lawbreaker when the work code 7 is disposed on an outer surface of the automatic wet wipe dispenser is avoided, on the other hand, a situation that mistakenly scanning the work code 7 by users when the work code 7 is disposed on the outer surface of the automatic wet wipe dispenser is further avoided.

It should be understood that the foregoing is merely a preferred embodiment of the present disclosure, and scopes of protection of the present disclosure are not limited to the foregoing embodiments, and the technical solutions of the present disclosure fall within the scopes of the protection of the present disclosure.

The drawings used in the above-mentioned embodiments show only certain embodiments of the present disclosure, and should not be considered as limiting the scopes of the protection of the present disclosure, and for those skilled in the art, other related drawings may be obtained according to these drawings without involving any inventive effort.

What is claimed is:

1. An automatic wet wipe dispenser, comprising:

a first box body; and a wet wipe dispensing module;

wherein the wet wipe dispensing module is disposed in the first box body, and the wet wipe dispensing module comprises a second box body and a roller assembly; the second box body is disposed in the first box body, a first wet wipe outlet is defined on the first box body, and a first accommodating cavity is defined in the first box body for accommodating the second box body; a first channel is formed between the first wet wipe outlet and the second box body; a second wet wipe outlet and a second accommodating cavity are defined on the second box body, the second wet wipe outlet is communicated with the first wet wipe outlet, and the second accommodating cavity is configured to accommodate a plurality of wet wipes; the second box body comprises an accommodating bottom surface, and the accommodating bottom surface tilts upward relative to the first channel, a bottom hole is defined on the accommodating bottom surface; the second wet wipe outlet is defined on one side of the second box body, and is adjacent to the accommodating bottom surface;

the roller assembly comprises a first roller assembly, the first roller assembly is disposed below the bottom hole, and the first roller assembly is configured to drive the plurality of the wet wipes to transfer into the first channel; and an inclined plate is disposed on a side of the bottom hole close to the first channel, the inclined plate is inclined downward from the accommodating bottom surface toward a direction of the first roller assembly, a bottom of the inclined plate is close to the first roller assembly.

2. The automatic wet wipe dispenser according to claim 1, wherein an inclined angle of the inclined plate is 45°~75°.

3. The automatic wet wipe dispenser according to claim 2, wherein the inclined angle of the inclined plate is 60°.

4. The automatic wet wipe dispenser according to claim 1, wherein the second box body comprises a front plate, the front plate is disposed at one side of the second box body close to the first channel, and the second wet wipe outlet is defined on a bottom of the front plate, and an inner surface of the front plate is disposed at a rear end of the accommodating bottom surface in a wet wipe dispensing direction, so as to form a gap between the bottom accommodating bottom surface and the inner surface of the front plate.

5. The automatic wet wipe dispenser according to claim 4, wherein the roller assembly further comprises a second roller assembly, the second roller assembly is disposed in the first channel, and the second roller assembly is capable of being synchronously rotated with the first roller assembly; the second roller assembly comprises a first sub roller, a second sub roller, and a third sub roller; the second sub roller and the first sub roller are disposed at intervals to form a second channel for the plurality of the wet wipes to pass through; the third sub roller is disposed above the first channel, and the third sub roller is disposed between the first sub roller and the first roller assembly.

6. The automatic wet wipe dispenser according to claim 1, wherein a work code is disposed in the first box body, and the work code is configured to be scanned by a worker for identity verification, the automatic wet wipe dispenser comprises a flip cover, a mounting module, and a signal transmission module;

the flip cover is disposed in an opening at a top of the first box body, a mechanical lock and a first sensor are disposed on the flip cover, the mechanical lock is capable of being locked on the first box body, the first sensor is configured to sense the flip cover;

the mounting module is disposed in the first box body, the mounting module comprises a quick release plate, the quick release plate is detachably disposed on a back of the first box body, a second sensor is disposed on the back of the first box body, and the second sensor is configured to sense the quick release plate;

the signal transmission module is electrically connected to a verification module, the first sensor, and the second sensor, and the signal transmission module is in network connection with a cloud server, the signal transmission module is configured to transmit a first signal of the first sensor and a second signal of scanning the work code by the worker to the cloud server;

the signal transmission module sends first alarm information to the cloud server when the signal transmission module receives the first signal of the first sensor but does not receive the second signal of scanning the work code by the worker for the identity verification within a predetermined period; or the signal transmission module sends the first alarm information to the cloud server when the signal transmission module receives the first signal of the first sensor but the worker does not pass the identity verification after scanning the work code.

7. The automatic wet wipe dispenser according to claim 6, wherein the work code is disposed on an inner surface of the flip cover.

8. The automatic wet wipe dispenser according to claim 7, wherein a third sensor is disposed in the first accommodating cavity, and the third sensor is configured to sense the second box body, and the third sensor is connected to the signal transmission module.

9. The automatic wet wipe dispenser according to claim 7, wherein at least two L-shaped blocks facing upward are disposed on the quick release plate;

at least two mounting holes are defined on the back of the first box body for the at least two L-shaped blocks to insert; and the mounting module further comprises at least two locking components, and the at least two locking components are rotatably disposed below the at least two mounting holes, so as to abut lower portions of the at least two L-shaped blocks when the at least two L-shaped blocks are inserted into the at least two mounting holes.

* * * * *